(No Model.)
R. A. CHESEBROUGH.
STREET RAILWAY.
No. 375,123. Patented Dec. 20, 1887.
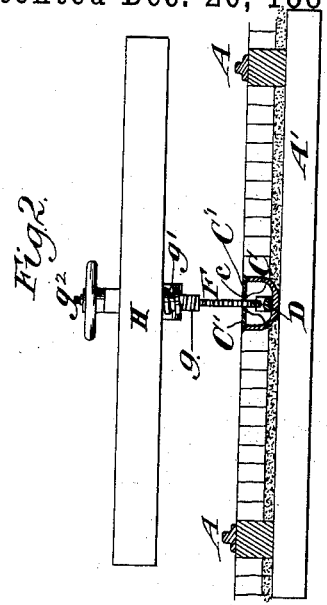
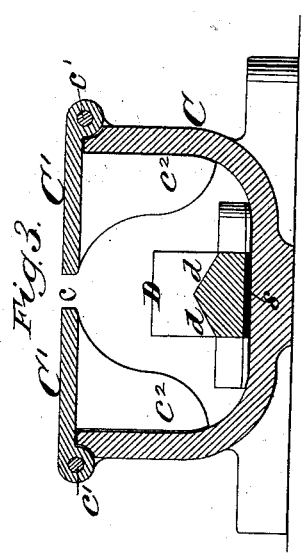
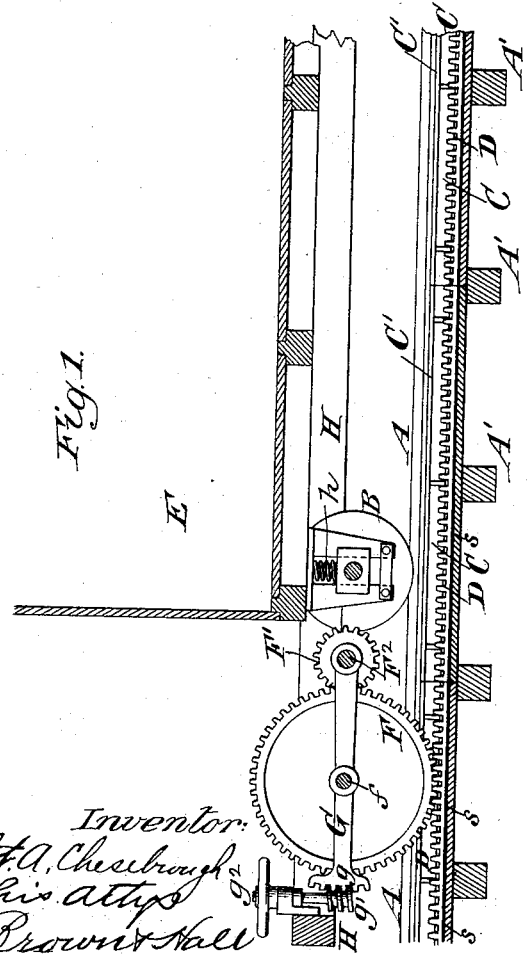
Witnesses:
C. Sundgren
Emil Herter
Inventor:
Rob't A. Chesebrough
by his att'ys
Brown & Hall

UNITED STATES PATENT OFFICE.

ROBERT A. CHESEBROUGH, OF NEW YORK, N. Y.

STREET-RAILWAY.

SPECIFICATION forming part of Letters Patent No. 375,123, dated December 20, 1887.

Application filed September 17, 1887. Serial No. 249,918. (No model.)

*To all whom it may concern:*

Be it known that I, ROBERT A. CHESEBROUGH, of the city and county of New York, in the State of New York, have invented a new and useful Improvement in Street-Railways, of which the following is a specification.

My invention involves the use upon each car or vehicle of a motor upon it and a driving wheel or pinion which engages a toothed rack fixed upon the track-structure.

In carrying out my invention I arrange between the track-rails and below the level of the street a narrow and shallow channel or trough, in the bottom of which a toothed rack is fixed and which communicates with the surface only by a narrow slot. The driving wheel or pinion upon the car or vehicle enters through this slot into the channel or trough, and by engaging the rack fixed therein propels the car or vehicle along the track-rails. The channel or trough is also provided with covers or covering-plates which project from its opposite edges inward and form between them the slot through which communication is had with the surface, and these covers or covering-plates are hinged or otherwise made removable, so that whenever desired they may be swung back or moved out of the way and the channel or trough brushed out with a broom to clear it of the dirt which may have entered it through its surface slot.

In the accompanying drawings, Figure 1 is a longitudinal section of such portions of a vehicle as are necessary to illustrate my invention, including, also, a longitudinal section of the channel or trough in which the fixed rack is arranged. Fig. 2 is a transverse section of the track-rails and the channel or trough, including, also, the driving wheel or pinion which engages with the rack; and Fig. 3 represents a transverse section, upon a larger scale, of the channel or trough and its contained rack.

Similar letters of reference designate corresponding parts in the several figures.

A designates the track-rails, on which run the supporting-wheels B of the car or vehicle E, as in an ordinary street-railway, and between the track-rails is a channel or trough, C, which is narrow and shallow, and in the bottom of which is arranged a fixed rack, D, having upwardly-presented teeth. The channel or trough C need be only a few inches deep and wide—say, for example, three to five inches deep and from four to six inches wide— and it may be supported upon the ties A' of the track-structure. The channel or trough C is entirely below the surface of the ground or street, and communicates with the surface only through a narrow slot, c, and through this slot projects a driving wheel or pinion, F, which is upon the car E and engages with the rack D.

The trough or channel C may be of substantially semicircular or segmental transverse section, and its open top is closed by removable covers or covering-sections C', which project from opposite edges and form between them the slot c, through which the channel communicates with the surface. These covers or covering-sections C' may be hinged, as indicated at c', at opposite sides of the trough or channel, and they may be supported under the tread of horses by segmental brackets or props $c^2$, cast upon them, and fitting against the sides and bottom of the channel or trough when the covers or covering-sections C' are swung inward to the position shown by full lines in Fig. 3. When such covers or covering-sections are swung upward and outward, ready access may be had to the channel or trough C, and any dirt which has dropped into it during the day through the slot c may be brushed from the channel by brooms. In this way the channel or trough may be kept clear without any considerable labor; and in order that the rack D may not hold the dirt which drops upon it the bottoms of its teeth may be inclined, as shown at d in Fig. 3. Thus any dirt falling upon the rack will be shed toward one side or the other thereof.

As here represented, the driving wheel or pinion F has a shaft or stud, f, on which it may turn, and gears with a pinion, F', upon a shaft, $F^2$, which, as here represented, constitutes the main shaft of the motor, whereby power is transmitted to the wheel F. This motor may be an electric motor, gas-motor, compressed-air motor, or, indeed, any other motor, as its character is not in any way involved in my invention.

In order to engage the wheel F with and disengage it from the rack D, and also to provide for raising the wheel out of and entering it into the channel or trough C, I have represented said wheel F as supported in a frame, G, which is fulcrumed upon the main motor-shaft $F^2$, and which, as here shown, is provided with an arc-shaped segment, $g$, of gear-teeth, with which engages a worm or screw, $g'$, upon an upright spindle or shaft, $g^2$. I have here represented the motor-shaft $F^2$ and the wheel F, together with their appurtenances, as supported upon a truck-frame, H, which is uninfluenced by the springs $h$, which support the car-body E.

It will be seen that the channel or trough which I employ is so small in size that it will be inexpensive and may be quickly laid and secured in place without making any deep excavation or in any way interfering with traffic upon the street.

It is of course obvious that more or less dirt will sift through the slot $c$ into the channel or trough C; but this is unimportant, as it may be readily swept away from the channel or trough by simply raising the covers or covering-plates C'.

I now prefer to support the rack D in the channel or trough C upon a bed or layer, $s$, of india-rubber or analogous slightly-yielding material, so as to relieve the rack and the wheel F from shock or jar in case of the car jumping, as when its wheels ride over a slight obstruction, and I thus avoid any injuries to the rack and wheels F of the cars.

It is evident that the pinion or wheel F might serve simply to start the car, and after the car is under way be lifted out of the rack and the car propelled through power applied to its axles.

What I claim as my invention, and desire to secure by Letters Patent, is—

The combination, with railway-track rails, of a narrow and shallow channel or trough between the rails and having removable covers projecting from opposite sides and forming a narrow slot between them, and a longitudinal rack secured in the channel or trough below the slot, for use in connection with a car having a driving wheel or pinion projecting through the slot and engaging the rack, substantially as herein described.

ROBT. A. CHESEBROUGH.

Witnesses:
C. HALL,
MINERT LINDEMAN.